No. 12,484. REISSUED MAY 22, 1906.

A. A. SMITH.

WIRE STRETCHER.

APPLICATION FILED JAN. 29, 1906.

WITNESSES:

J. S. Abbott

M. Gertrude Ady

INVENTOR.

Arthur A. Smith

BY

Burton T. Burton

His ATTORNEYS

ANDREW B. GRAHAM CO., PHOTO-LITHOGRAPHERS, WASHINGTON, D. C.

UNITED STATES PATENT OFFICE.

ARTHUR A. SMITH, OF GOLDFIELD, IOWA.

WIRE-STRETCHER.

No. 12,484. Specification of Reissued Letters Patent. Reissued May 22, 1906.

Original No. 769,027, dated August 30, 1904. Application for reissue filed January 29, 1906. Serial No. 298,566.

*To all whom it may concern:*

Be it known that I, ARTHUR A. SMITH, a citizen of the United States, residing at Goldfield, in the county of Wright and State of Iowa, have invented a new and useful Improvement in Wire-Stretchers, of which the following is a specification, reference being had to the accompanying drawings, forming a part thereof.

The invention relates to improvements in wire-stretchers.

The object of the present invention is to improve the construction of wire-stretchers and to provide a simple and comparatively inexpensive device of great strength and durability adapted for stretching fence-wires and capable of holding the same while they are being stapled or otherwise secured to a fence-post.

A further object of the invention is to provide a wire-stretcher of this character which will enable a wire to be quickly stretched to the desired tension and which will also be capable of enabling the ends of a broken wire to be drawn together for splicing the same.

Another object of the invention is to provide a wire-stretcher which when applied to a fence-post will be firmly supported in position for stretching a fence-wire.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 1:
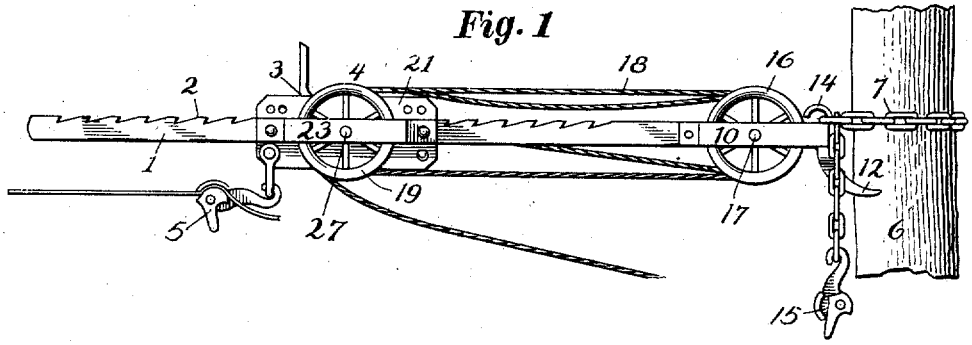
Figure 2:
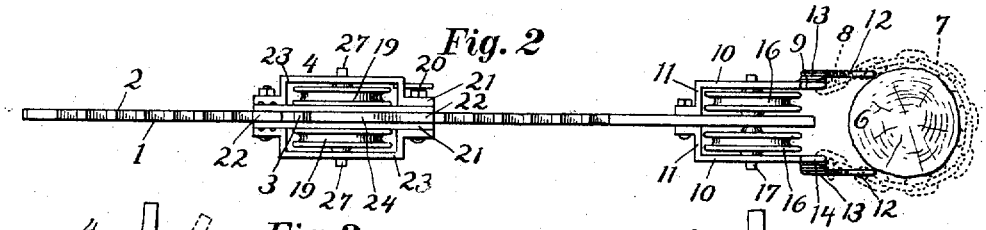
Figure 3:
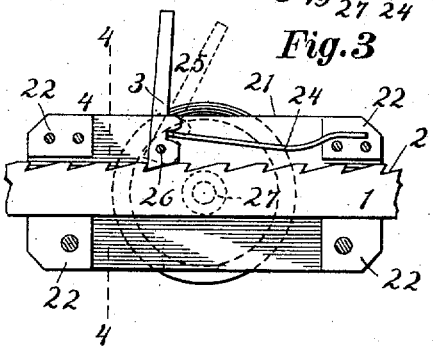
Figure 4:
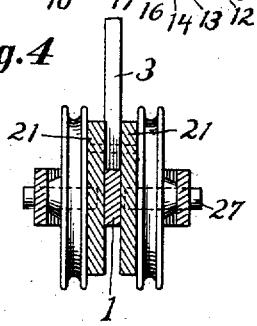
Figure 5:
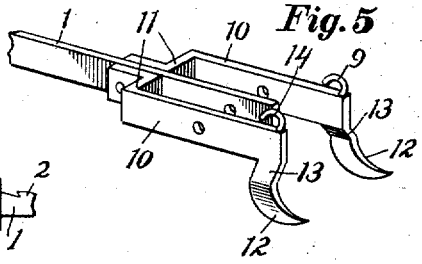
Figure 6:
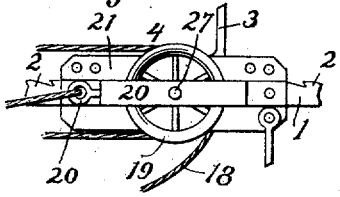

In the drawings, Figure 1 is a side elevation of a wire-stretcher constructed in accordance with this invention. Fig. 2 is a plan view of the same. Fig. 3 is a longitudinal sectional view of the front or outer portion of the wire-stretcher. Fig. 4 is a sectional view taken practically on the line 4 4 of Fig. 3. Fig. 5 is a detail perspective view of the rear or inner portion of the ratchet-bar, illustrating the arrangement of the post-engaging hooks. Fig. 6 is a detail view of the slide and a portion of the combined guide and ratchet-bar, illustrating the manner of attaching the flexible connection to the slide.

Like numerals of reference designate corresponding parts in all the figures of the drawings.

1 designates a combined guide and ratchet-bar provided at its upper edge with ratchet-teeth 2, adapted to be engaged by a spring-actuated pawl or dog 3 of a slide 4, which carries a wire-clamp 5. The ratchet-bar 1 is connected with a post 6 or other suitable support by a chain 7, which is connected at its end 8 with an eye 9 of one of a pair of side pieces or bars 10. The side pieces or bars 10, which are secured at their inner or front ends to the inner portion of the ratchet-bar, at opposite sides thereof, are angularly bent to form laterally-extending portions or arms 11, and the rear terminals of the side bars or pieces 10 are provided with depending laterally-offset post-engaging hooks 12, which are located beneath the points of attachment of the chain and which have pointed engaging ends. The hooks, which are adapted to be partially embedded in a post, will in practice be about three inches apart at their engaging portions; but they may be arranged in any desired manner, as will be readily understood. The upper portions of the shanks of the hooks 12 are bent outward at 13, as clearly shown in Fig. 5. The chain extends around the back of the post from one of the side bars, which is provided with the eye 9, to the other side bar, which has an open eye or hook 14, adapted to engage the different links of the chain, whereby the latter is readily adjusted to suit the size of the post. The chain extends horizontally from the wire-stretcher, and it coöperates with the post-engaging hooks, whereby the wire-stretcher is firmly held in a horizontal position.

The free end of the chain 7 is provided with a clamp 15, adapted to engage a fence-wire and designed for holding a fence-wire after the same has been stretched and while arranging the clamp 5 for again stretching the fence-wire. The clamp 15 is also adapted for use in connection with the clamp 5 when the device is employed for stretching the ends of a broken fence-wire to splice the same.

The side bars or pieces 10 are spaced from the rear portion of the ratchet-bar, which extends to within a short distance of the rear end of the side pieces, and in the spaces between the ratchet-bar and the side pieces are arranged grooved pulleys 16, mounted on a shaft or axle 17, which pierces the side pieces and the rear portion of the ratchet-bar. The grooved pulleys receive a rope 18 or other suitable flexible connection, which is arranged on the said pulleys 16 and on a pair of corresponding pulleys 19, which are mounted on a slide at opposite sides thereof and which are also grooved, as clearly shown in Fig. 2. One end of the rope 18 is attached to the slide by means of an eye 20, and the other end is free and is adapted to be pulled by the operator for stretching a fence-wire. The loops of the rope or cable are arranged at opposite sides of the ratchet-bar, and there is no liability of the rope or cable becoming tangled or twisted. The slide comprises a pair of plates 21, spaced apart by corner-blocks 22 and connected by suitable fastening devices, which pierce the plates and the corner-blocks. The slide is also provided with laterally-extending braces 23, consisting of metal straps or bars angularly bent at each end, as shown, and forming openings or spaces for the reception of the grooved pulleys 19. The upper and lower blocks 22 are spaced apart to provide a longitudinal opening for the ratchet-bar, and the pawl or dog 3 is pivotally mounted between the upper blocks, as clearly shown in Fig. 3 of the drawings. It is held in engagement with the ratchet-bar by a spring 24, secured at one end to one of the inner or rear corner-blocks and having its free end engaging the pawl or dog in a recess 25 thereof. The recess 25 is located above the pivot 26 when the dog is in engagement with the ratchet-bar, and the spring is also adapted to hold the pawl or dog out of engagement with the ratchet-bar, as illustrated in dotted lines in Fig. 3 of the drawings, whereby the slide is freely movable on the ratchet-bar to enable it to be quickly returned to the outer portion thereof. The grooved pulleys 19 are mounted upon a pair of shafts or axles 27, which are located at opposite sides of the ratchet-bar and which are supported by the side plates and by the side braces.

When it is desired to stretch a fence-wire for securing the same to a fence-post, the wire-stretcher is mounted on the latter and the slide is moved outward on the ratchet-bar to the outer portion thereof. The clamp 5 is then engaged with the wire, which is stretched by pulling the rope or cable, and thereby draws the slide inward on the ratchet-bar. The pawl or dog successively engages the teeth of the ratchet-bar and locks the slide against outward movement. A wire may be successively stretched by the device, and the clamp 15 will hold the wire while the slide is being arranged for again stretching the wire. The ends of a broken wire may be drawn together for splicing by connecting them with the clamps 5 and 15.

The wire-stretcher is also adapted for stretching telegraph, telephone, and other wires.

Having thus described my invention, what I claim as new, and desire to secure by Letters Patent, is—

1. A wire-stretcher comprising a combined guide and ratchet-bar provided at one end with means for securing it to a post, a slide having an opening for the bar and movable along the same and provided with means for connecting it with a wire, means carried by the slide for engaging the bar, pulleys mounted on the slide and on the inner end of the bar, a flexible connection arranged on the pulleys for operating the slide, substantially as described.

2. A wire-stretcher comprising a bar provided at one end with means for securing it to a post; a slide movable along the bar and provided with means for connecting it with a wire; coöperating sets of power-multiplying pulleys mounted respectively on the bar and on the slide; a cable passing around the pulleys for such power-multiplication, and means for automatically holding the slide to the bar against retraction by the wire, for retaining the gain made by the operation of the cord and pulleys.

3. A wire-stretcher comprising a bar provided at one end with means for securing to a post; a slide movable along the bar and provided with means for connecting it with a wire; pulleys arranged in sets of equal number, one set mounted upon the bar and the other upon the slide; a cable suitably encompassing said pulleys in order, for multiplying power, the slide and bar being provided with coöperating means for retaining the gain of the slide on the bar obtained by the operation of the cord and pulley against the pull of the wire on the slide.

4. A wire-stretcher comprising a combined guide and ratchet-bar provided at one end with means for securing it to a post or support, a slide mounted on the said bar and provided with a pawl or dog for engaging the same, and having means for connecting it with a wire, pulleys arranged in pairs and mounted on the slide and the bar and arranged at opposite sides of the latter, and a flexible connection arranged on the pulleys for operating the slide, substantially as described.

5. A wire-stretcher comprising a longitudinal bar, side pieces connected with the bar at one end thereof and laterally opposite from the same and provided with depending post-engaging hooks, a flexible connection secured to one of the side pieces and adjustably connected with the other, pulleys mounted in the spaces between the bar and the side pieces, a slide mounted on the bar and provided at opposite sides thereof with pulleys, and a flexible connection arranged on the pulleys for operating the slide, substantially as described.

6. A wire-stretcher comprising a combined guide and ratchet-bar provided at its inner end with means for connecting it with a post, a pair of pulleys mounted on the inner portion of the bar at opposite sides thereof, a slide mounted on the bar, and comprising plates spaced apart to receive the guide-bar and braces mounted on the plates and forming openings, pulleys mounted on the slide and arranged in the openings thereof, a spring-actuated dog located between the said plates and engaging the ratchet-bar, and a flexible connection arranged on the pulley for operating the slide, substantially as described.

In testimony whereof I have hereunto set my hand, in the presence of two witnesses, at Chicago, Illinois, this 19th day of January, 1906.

ARTHUR A. SMITH.

In presence of—
J. S. ABBOTT,
M. GERTRUDE ADY.